Patented July 16, 1940

2,208,120

UNITED STATES PATENT OFFICE 2,208,120

PHARMACEUTICAL PREPARATION AND METHOD OF MAKING SAME

William B. Coleman, Bloomfield, N. J.

No Drawing. Application March 2, 1938,
Serial No. 193,435

7 Claims. (Cl. 167—82)

This invention relates to pharmaceutical preparations and the manufacture thereof. It relates especially to pharmaceutical preparations containing acetyl salicylic acid or bromatological salts thereof.

Acetyl salicylic acid is extensively used for medicinal purposes. Likewise as a popular remedy it has a wide sale for the treatment of headaches, migraine and similar minor ailments. Acetyl salicylic acid is usually sold under the name "Aspirin." It is generally made up with a suitable filler such as starch and is formed into tablets generally by compression, each tablet containing, for example, about 5 grains of acetyl salicylic acid. The acetyl salicylic acid which is made up into these tablets is generally in a fine grained condition and is made up so as to pass an 80 mesh screen, the bulk of the particles being so coarse that they are retained on a screen about 90 mesh or about 100 mesh. Especially under conditions of dampness, acetyl salicylic acid tends to break down into acetic and salicylic acids and lose most of its value as a medicine. When the acetyl salicylic acid is produced so that the particles can pass an 80 mesh screen and are retained on a slightly finer screen, the particles are sufficiently finely divided to dissolve when taken internally but are not so finely divided as to be subject to extensive decomposition upon exposure to the atmosphere.

Attempts have been made heretofore to combine the acetyl salicylic acid of the character above-mentioned with filler materials other than starch. One of the filler materials which has been proposed heretofore is sugar. For example, sugar in granular form has been mixed mechanically, with granular acetyl salicylic acid of the character mentioned above and then formed into tablets by compressing the granular mixture. However, since the sugar tends to dissolve much more rapidly than the acetyl salicylic acid, the tablet is disagreeable to take, inasmuch as the sugar dissolves rapidly, leaving the gritty acetyl salicylic acid in the mouth. Attempts have also been made to dissolve acetyl salicylic acid in sugar by melting the sugar, rendering it substantially free of water, and then maintaining the acetyl salicylic acid mixed with the melted sugar, for the purpose of dissolving the acetyl salicylic acid in the sugar. I have found, however, that by attempting to dissolve the acetyl salicylic acid in the melted sugar there results a serious decomposition of the acetyl salicylic acid into acetic acid and salicylic acid. Moreover, I have found that acetyl salicylic acid is so insoluble in sugar that much of the granular acetyl salicylic acid remains undissolved. When the sugar is permitted to harden on cooling, the mass contains decomposed acetyl salicylic acid together with undissolved granules of acetyl salicylic acid. Since these granules are much less soluble in water than sugar, the dissolving of the mass in the mouth dissolves away the sugar, leaving the mass with a very gritty and disagreeable feeling surface.

It is the purpose of this invention to incorporate acetyl salicylic acid or bromatological salts thereof in a water-soluble edible material such as sugar in such form that it is readily dissolved when taken internally and in such form that it is not unpleasant to take. To accomplish this purpose, the acetyl salicylic acid is reduced to a state of subdivision which is extremely minute as compared with the acetyl salicylic acid which has heretofore been produced. In preferred practice I reduce the acetyl salicylic acid to such a fine state of subdivision that the particles pass through a screen having 170 to 300 meshes to the inch. For commercial production I employ acetyl salicylic acid which passes a 200 mesh screen as is mentioned in connection with the example of this invention which is described below. While the foregoing constitutes preferred practice, some of the advantages of this invention are achieved when the acetyl salicylic acid has been reduced to such a state of subdivision that it passes a 140 mesh screen. Moreover, the advantages mentioned are achieved in large degree when at least 90% of the acetyl salicylic acid or bromatological salts thereof passes screens of the fineness above-mentioned.

The extremely finely divided acetyl salicylic acid which has been mentioned above is incorporated by me in a water-soluble and coherent edible mass, e. g., in a mass comprising sugar. While this may be done by compressing the acetyl salicylic acid with dry sugar, for example, I prefer to melt the sugar and then incorporate the very finely divided acetyl salicylic acid therein under conditions which prevent decomposition of the acetyl salicylic acid and with a minimum of solution of the acetyl salicylic acid in the sugar. As distinguished from what has been proposed heretofore, the acetyl salicylic acid is merely dispersed as discrete particles in the water-soluble edible material. In the very finely divided condition the acetyl salicylic acid is hardly noticeable in the resulting product. The particles are so minute in size that they dissolve practically as readily as the sugar, when sugar is used. This overcomes any objectionable grittiness in the product. Likewise the acetyl salicylic acid is rendered more immediately effective when taken internally. While the acetyl salicylic acid is extremely finely divided, it is nevertheless protected by the water-soluble edible material such as sugar in which it is dispersed and so that it does not decompose with the formation of salicylic acid and acetic acid in a humid atmosphere. In this connection, it is especially desirable in the practice of this invention to disperse the extremely finely divided salicylic acid in a water-soluble edible material which is in continuous phase such as a solid solution. This seals the resulting product from moisture in the atmosphere and affords protection for the extremely minute particles of acetyl salicylic acid.

For purposes of illustration, a pharmaceutical preparation according to this invention may be made up using the following ingredients:

| Ingredient | Pounds |
|---|---|
| White granulated sugar | 65 |
| Corn syrup glucose | 35 |
| Water | 25 |
| Citric acid | 1.25 |
| Natural oil of lemon | 0.25 |
| Certified yellow color | 0.6 |
| Acetyl salicylic acid passing a 200 mesh screen | 4.6 |

The sugar, glucose and water are weighed and put in a steam jacketed kettle which is connected to a vacuum pump. With a partial vacuum of 28" of mercury, the mixture is heated until the temperature is about 310 to 320° F. and until the water is substantially completely driven off. The mixture is then withdrawn and while the temperature is between about 180° F. and 320° F. the citric acid, natural oil of lemon and color are added with stirring. Then the extremely finely-divided particles of acetyl salicylic acid are stirred into the mixture, only sufficient stirring being employed to disperse the acetyl salicylic acid substantially uniformly throughout the mixture. The mixture is then molded during cooling into individual units and without substantial solution of the acetyl salicylic acid. For example, 60 units may be made per pound and in such case each unit will contain 5 grains of acetyl salicylic acid.

The resulting preparation is preferably made up in the form of a "pop", that is, each unit is caused to adhere to the end of a small stick. This is highly desirable when the pharmaceutical preparation is to be administered to very young children. It is very difficult to get a young child to swallow a tablet whole. Likewise very small children are likely to choke on a tablet being dissolved in the mouth. By producing the pharmaceutical preparation in the form of a "pop", the preparation may be safely administered to very young children. Further in this connection, the advantage of the present invention in connection with the administration of acetyl salicylic acid to young children in the form of a "pop" is apparent in view of the fact that acetyl salicylic acid in itself has a taste which is very disagreeable to some people, and especially to young children. However, children will readily eat candy in the form of a "pop". By having the acetyl salicylic acid in an extremely finely divided condition the "pop" appears to be no different from an ordinary candy "pop," inasmuch as the acetyl salicylic acid in its extremely finely divided condition does not form a gritty material in the mouth or form a gritty surface on the "pop" but is very readily dissolved at the same time and at the same rate that the sugar is dissolved. The taste of the acetyl salicylic acid is disguised by the sugar and the flavoring materials.

Obviously, the example given above may be modified in many ways. If desired, the glucose may be left out. The glucose acts as an anti-crystallization agent and is desirable in producing a "pop" free of sugar crystals and of a character which seals the acetyl salicylic acid from the action of moisture in the air. Other similar materials may be used such as invert sugar to replace part or all of the corn syrup glucose. Moreover, other anti-crystallization agents such as tartaric acid may be used.

Of course, the flavor and color may be varied as desired. Other flavors such as orange, for example, may be used instead of lemon. Other acids than citric acid may be used. In the formula above, citric acid helps to bring out the flavor of oil of lemon. An acid such as acetic acid may also be used for this purpose. The color merely serves to identify the flavor of the preparation.

The pharmaceutical preparation above described is useful whenever the administration of acetyl salicylic acid is desirable. Moreover, it has certain added advantages due to the fact that the sugar and glucose counteract acidosis. Thus, for example, the pharmaceutical preparation above described is an excellent one for post-tonsillectomy treatment. In such treatment the acetyl salicylic acid relieves the soreness of the throat. At the same time the sugar and glucose relieve the acidosis resulting from the anesthesia. Likewise, the sugar and glucose tend to counteract the acid character of the acetyl salicylic acid.

With regard to the content of the acetyl salicylic acid in the pharmaceutical preparation, this can be varied as desired. For example, the acetyl salicylic acid may be as high as 50% of the pharmaceutical preparation. At the other extreme, it may be as low as 1%. When the content of acetyl salicylic acid is any lower than 1%, the value of the article as a pharmaceutical product is lessened, inasmuch as an excessive amount of sugar and glucose must be administered in order to administer a sufficient amount of acetyl salicylic acid to have the physiological effect desired. Usually in an article such as a "pop," it is desirable to include therein about 4% of acetyl salicylic acid. When the acetyl salicylic acid is in an extremely finely divided condition, the presence of such amounts of acetyl salicylic acid is hardly noticeable in the preparation, from the point of view either of grittiness or of taste.

While one method of preparing the pharmaceutical preparation of this invention has been mentioned above, it is apparent that other methods may also be employed. For example, the methods used by candy makers in making hard candy are adapted to the manufacture of the pharmaceutical preparation of this invention. In any such methods, however, it is desirable to eliminate substantially all of the water, inasmuch as acetyl salicylic acid is much more subject to decomposition in the presence of water than when water is substantially completely absent. Moreover, it is desirable to mix in the acetyl salicylic acid when the heat liquefied mass is below about 240° F. Preferably the acetyl salicylic acid is included as a final operation and just prior to cooling so that the acetyl salicylic acid will be distributed in undecomposed condition in the mass after it has hardened.

While the use of acetyl salicylic acid has been mentioned hereinabove, by way of example, it is also possible to use bromatological salts of acetyl salicylic acid such as calcium and magnesium salts. Heretofore calcium and magnesium acetyl salicylates have been proposed and in some respects are superior to acetyl salicyclic acid due to their solubility and non-acid character. However, the salts such as calcium and magnesium salts are much more subject to decomposition than acetyl salicylic acid and, for this reason, have not been successfully marketed as a pharmaceutical preparation. However, by incorporating the salts of acetyl salicylic acid in a water-soluble but water-free medium, such as sugar or a mixture of sugar and glucose, the salts of acetyl salicylic acid are protected against decomposition. In this connection, it may be added that even when acetyl salicylic acid is made up in the form of a "pop," for example, in accordance with this invention, the acidity of the acetyl salicylic acid is counteracted by the anti-acidosis qualities of the sugar or sugar and glucose with which the acetyl salicylic acid is mixed.

While this invention has been described in connection with certain illustrations of the practice of this invention, it is to be understood that this has been done merely for the purpose of affording examples of this invention and that the scope of this invention is to be governed by the language of the following claims.

I claim:

1. A pharmaceutical preparation in the form of a solid solution comprising sugar in which solution is dispersed in the form of fine discrete particles a substantial quantity of a compound selected from the compounds acetyl salicylic acid and bromatological salts thereof, said compound being in such finely-divided condition that at least about 90% thereof passes a 140 mesh screen.

2. A pharmaceutical preparation in the form of a coherent mass comprising a solid solution containing sugar in which solid solution is dispersed in the form of fine discrete particles a compound selected from acetyl salicylic acid and bromatological salts thereof, said compound constituting at least about 1% of said preparation and being in such very finely divided condition that at least about 90% thereof passes a 140 mesh screen.

3. A pharmaceutical preparation in the form of a coherent mass comprising a solid solution containing sugar in which solid solution is dispersed in the form of fine discrete particles a compound selected from acetyl salicylic acid and bromatological salts thereof, said compound constituting at least about 1% of said preparation and being in such finely divided condition that at least about 90% thereof passes a 170 mesh screen.

4. A pharmaceutical preparation in the form of a solid solution comprising sugar and an anti-crystallization agent in which solution is dispersed in the form of fine discrete particles a compound selected from acetyl salicylic acid and bromatological salts thereof, said compound constituting at least about 1% of said preparation and being in such finely divided condition that at least about 90% thereof passes a 140 mesh screen.

5. A pharmaceutical preparation in the form of a coherent mass comprising a solid solution containing sugar in which solid solution is dispersed in the form of fine discrete particles a compound selected from acetyl salicylic acid and bromatological salts thereof, said compound constituting at least about 4% of said preparation and being in such finely divided condition that at least about 90% of said compound passes a 170 mesh screen.

6. A method of making a pharmaceutical preparation which comprises preparing a non-aqueous water-soluble edible mass comprising sugar, adding to the mass a compound selected from the compounds acetyl salicylic acid and bromatological salts thereof, said compound being in such finely divided condition that at least about 90% thereof passes a 140 mesh screen, while the mass is in a heat liquefied condition at a temperature below 240° F., distributing the compound in the mass and cooling the mass before the compound dissolves to substantial extent.

7. A method of making a pharmaceutical preparation which comprises preparing a non-aqueous water-soluble edible mass comprising sugar and an anti-crystallization agent for sugar, adding to the mass a compound selected from the compounds acetyl salicylic acid and bromatological salts thereof, said compound being in such finely divided condition that at least about 90% thereof passes a 170 mesh screen, while the mass is in a heat liquefied condition below about 240° F., distributing the compound in the mass and cooling the mass before said compound dissolves to substantial extent, to form a solid solution in which said finely divided particles of said compound are distributed.

WILLIAM B. COLEMAN.